Feb. 13, 1968   W. BAYER   3,368,730
ARTICLE MARKING APPARATUS
Filed June 2, 1966   4 Sheets-Sheet 1

INVENTOR
WOLFGANG BAYER

BY
Curtis, Morris & Safford
ATTORNEYS

INVENTOR
WOLFGANG BAYER

BY
Curtis, Morris + Safford
ATTORNEYS

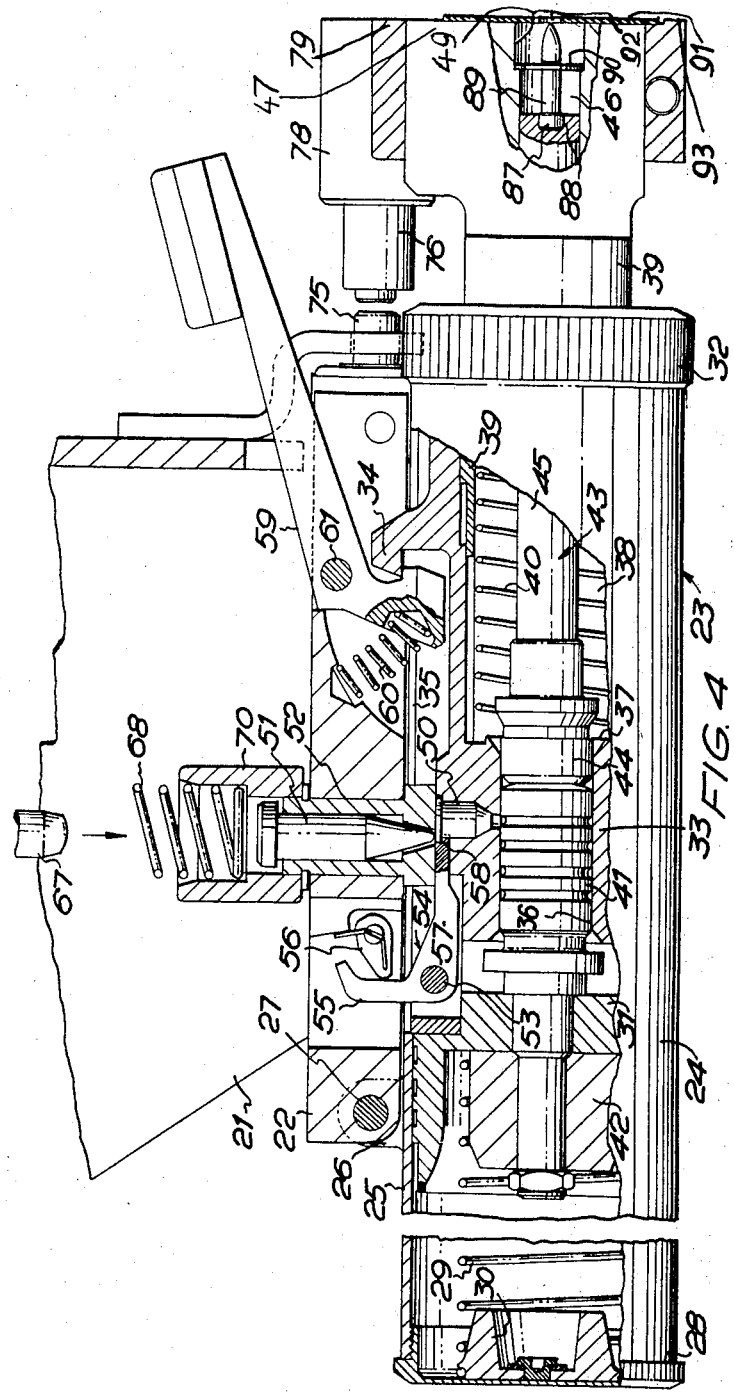

United States Patent Office 3,368,730
Patented Feb. 13, 1968

3,368,730
ARTICLE MARKING APPARATUS
Wolfgang Bayer, Schaan, Liechtenstein, assignor to Hilti Aktiengesellschaft, Schaan, Liechtenstein
Filed June 2, 1966, Ser. No. 554,804
Claims priority, application Great Britain, June 3, 1965, 23,626/65
10 Claims. (Cl. 227—8)

The present invention relates to apparatus for securing identification plates and the like to articles such as hot metal slabs.

Considerable difficulty has been experienced in the steel and allied industries in applying identification markings to metal slabs, blooms and the like. Heretofore the marking of the metal bodies, such as slabs and blooms after the rolling thereof for subsequent identification, has been effected in a number of ways, but none of these has been completely satisfactory. For example, chalking or marking with some other medium can only be effected after the slab or bloom has been cooled to near room temperature and can only be done a considerable time after rolling, usually after it has been stockpiled, so that such marking becomes a separate operation unrelated to the actual rolling of a billet or ingot to form the slab or bloom. Therefore, as the marking has no direct correlation to the rolling operation the identification is subject to error. Furthermore, these markings tend to become erased or obliterated while the articles are stockpiled.

It also has been proposed to weld identification plates to the slabs or blooms after rolling while they are still hot, but this, too, is not satisfactory because contraction of the hot metal after the welding is apt to result in the breaking of the weld causing the plates to fall off. This difficulty is aggravated by scale formation occurring on the newly rolled metal bodies, which makes the weld insecure.

One of the objects of this invention is to provide an apparatus for attaching identification plates or the like to articles, regardless of the temperature and condition thereof, in a simple, quick and convenient manner.

Another object is to provide an apparatus of the type indicated which may be loaded at one station and then moved to another station remote from the loading station where it may be operated to attach an identification plate to the article.

Another object is to provide a cartridge operated apparatus of the type indicated which is actuated by remote control, but only when the identification plate has been moved into engagement with the article.

Still another object is to provide an apparatus of the type indicated for applying an identifying plate onto a hot billet in a rolling mill which is of a relatively simple and compact construction, adapted for economical manufacture and one which is reliable in operation.

In order that the invention may be fully understood, it will be described further, by way of example, with reference to the accompanying drawings which illustrate two practical embodiments thereof, it being understood that the details hereinafter set forth are illustrative of, and not limitative of, the scope of the invention.

In the drawings:

FIGURE 4 is an enlarged sectional view taken on line IV—IV of FIGURE 5 and showing the details of one of the fastener driving tools and its mounting on the carriage;

Figure 1:
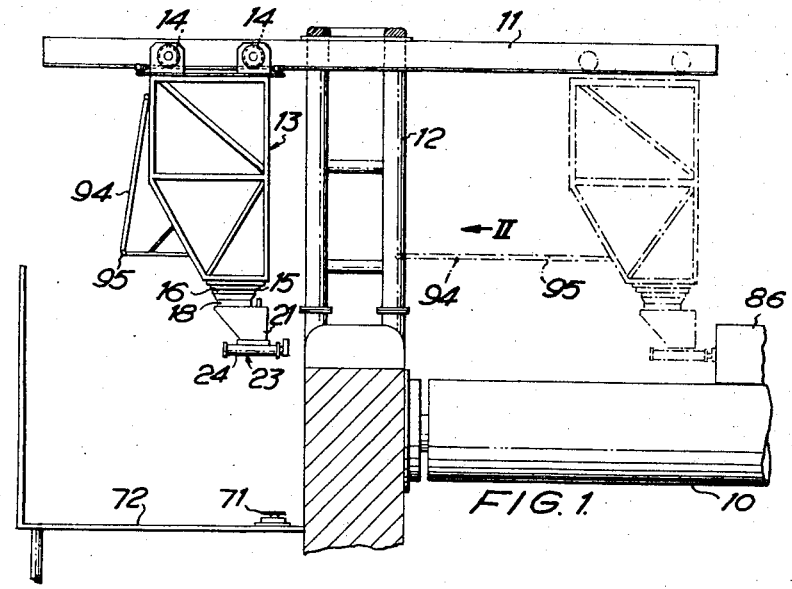
FIGURE 1 is a side elevation view partly in section showing an apparatus incorporating the novel features of the present invention when installed in a steel rolling mill.
Figure 2:
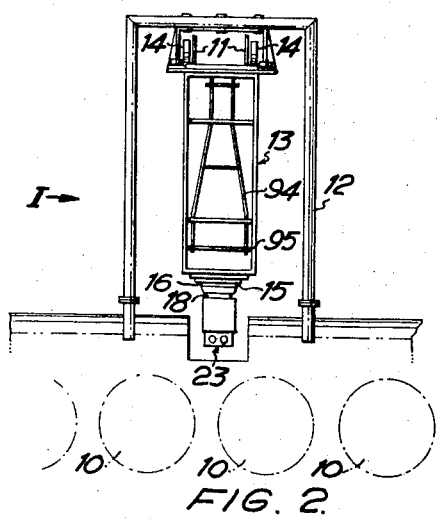
FIGURE 2 is a front elevational view of the apparatus shown in FIGURE 1.

Referring first to FIGURES 1 to 6 of the drawing, a preferred embodiment of the apparatus incorporating the present invention is shown installed at one side of a steel rolling mill and at a location past which slabs, blooms or the like move immediately after having been rolled. If desired, the rolled articles may be cut to length, during such movement while on their way to be stockpiled or to be subjected to further treatments, e.g. for rolling into strip or sheet form. Such location will hereinafter be referred to as the "marking station" for convenience and the slabs, blooms or the like move past the station on rollers 10 which are driven and controlled by an operative to arrest each slab, bloom or the like at the marking station.

The apparatus comprises a pair of overhead angle-sectioned guide rails 11, appropriately supported by a gantry 12. A carriage 13 is mounted to move along said rails and is in the form of a skeletal framework having wheels 14 at its upper edge engaging with the rails 11, so that the carriage 13 hangs from such rails. A substantially horizontal mounting plate 15 (FIGURE 3) is mounted on the lower end of the carriage 13 and the plate has a boss 16 secured to its underside with a bore which is stepped to define an upwardly directed annular shoulder 17. Within the boss 16 is a cylindrical column 18, of short axial length, having a flange 19 at its upper end resting on the annular shoulder 17 of the boss so that the column 18 is rotatable relative to the boss and constitutes in effect a turntable-like arrangement for a plate 20 secured to its lower end.

The turntable plate 20 is formed integrally with a pair of downwardly directed webs 21 at the lower ends of which is secured a substantially horizontal base plate 22 (FIGURE 4) forming part of a fastener driving tool assembly 23. This assembly 23 comprises a pair of substantially identical cartridge-actuated fastener driving tools 24 mounted side-by-side on the base plate 22 and parallel to one another, so that only one of the tools needs to be described in detail.

Each tool 24 comprises a tubular body including a cylindrical casing 25 provided with a radial lug 26 at a point between its ends and extending into a clevis on base plate 22 and pivotally connected thereto by a pin 27. One end of the casing 25 is closed by an end cap 28. A recoil spring 29 in said casing 25 bears against the end cap 28 which has a central retainer 30 secured thereto for positioning the end of the spring. The other end of the spring 29 abuts against a recoil sleeve 31 slidably mounted in the casing 25 and urged towards the other end thereof by said spring. The opposite or right hand end of casing 25 as viewed in FIGURE 4 is provided with a centrally-apertured end cap 32 and will, for convenience, be referred to as "the front end."

A barrel 33 is slidably mounted in the casing 25 and fixed against rotation relative to the casing by a hooked extension 34 extending outwardly through a longitudinal slot 35 therein. This barrel 33, at its rear end (i.e. the end adjacent the recoil sleeve 31 and remote from the front end of the casing 25) has a bore 36 of smaller diameter which merges through a shoulder 37 into a wider counterbore 38 at the front end of the tool. A telescoping barrel section 39 fits into the counterbore 38, to project from the front end of the casing, and is retained from sliding out of the barrel by the end cap 32 of the casing 25. A helical spring 40 has one end abutting shoulder 37 between the bore 36 and counterbore 38 of the barrel 33 and its other end abutting the telescoping section 39 which urges the latter towards a position of maximum protrusion from the casing 25 of the tool. It will be understood that the telescoping section 39 can be pressed into the barrel against the action of the spring 40.

The bore 36 in the barrel 33 is open towards the rear end of the casing 25 and accommodates a recoil piston 41 which is connected, by way of a heavy mass 42, to the recoil sleeve 31. The barrel 39 serves also to mount a front plunger 43 of the tool. This front plunger 43 has a sliding fit in the bore 36 of the barrel 33 and a piston-like head 44 which confronts the recoil piston 41, and also has a reduced diameter shank part 45 which extends into and has a sliding fit in a bore 46 at the forward end of the telescoping section 39 of the barrel. Shank 45 terminates near to the front end of the telescoping section 39 and mounts a base plate 47 of the tool. An axially-disposed magnet 48 (FIGURE 3) is set into this base plate 47. Shallow axial recesses 49, one for each of the tools, are provided in the front end of the base plate 47 common to the two tools.

The side of the barrel 33 of the tool which registers with the slot 35 in the casing 25, is adjacent the base plate 22, already described, and a radially-directed cartridge chamber 50 is provided in said side of the barrel 33. A firing pin 51 for each tool 23 is provided in the base plate 22 at a location opposite said cartridge chamber 50 and each pin is slidable in a guide 52 secured into the base plate 22, so as to be axially movable towards the cartridge chamber. Pivotally mounted at 53 on the barrel 33 adjacent the cartridge chamber 50 is a cartridge ejector 54 in the form of a bell-crank lever, one arm 55 of which projects towards the base plate 22 and co-operates with a pivoted cam 56 on the latter, and the other arm 57 of which has a forked end 58 for engagement with the rim of a cartridge (not shown) in the chamber 50.

The hooked extension 34 of the barrel 33 co-operates with a manually-operable catch 59 which is pivotally connected at 61 to the base plate 22 and actuated by a spring 60 to retain the tool 23 in a horizontal position below the base plate 22.

Figure 3:
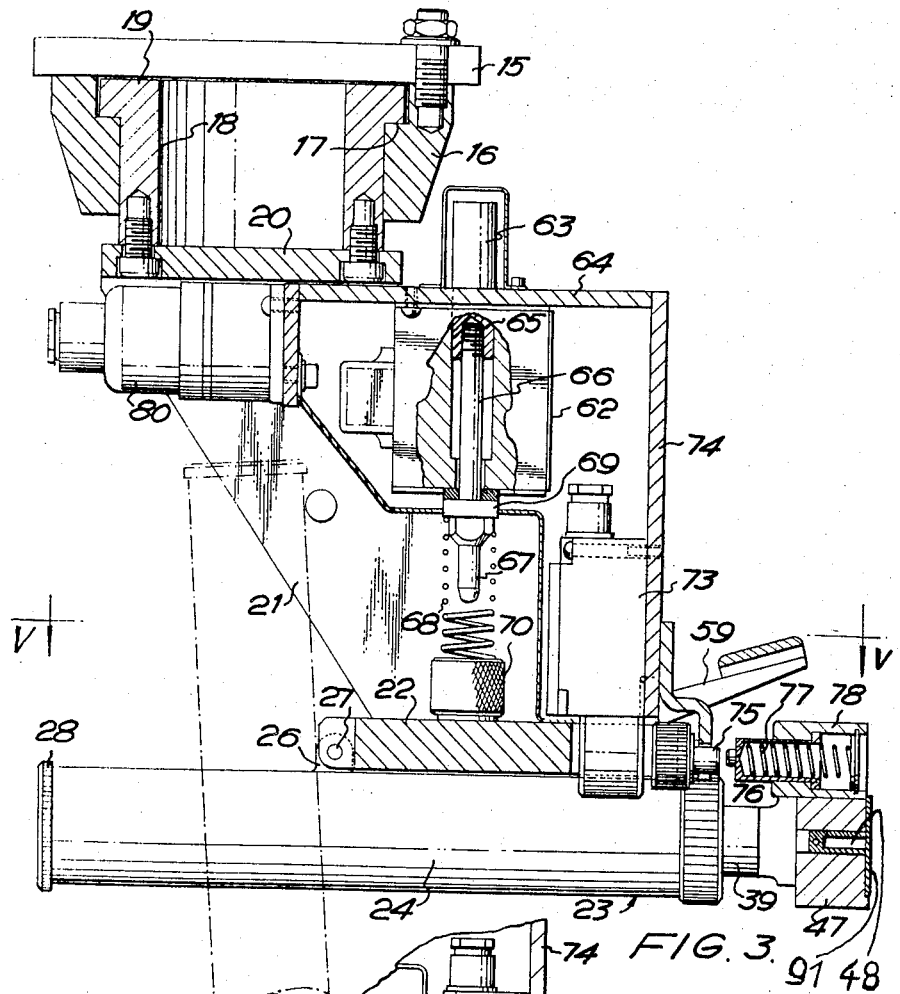
FIGURE 3 is an enlarged part-sectional view in side elevation of the apparatus in FIGURES 1 and 2 and showing one of the cartridge operated fastener driving tools and its firing mechanism.

Returning now to the turntable plate 20, and to FIGURE 3, mounted on the webs 21 below such plate 20 are a pair of solenoids 62 each having a respective armature 63 which projects upwards through a mounting plate 64 extending between the webs 21 beneath the turntable plate 20.

The armatures 63 are each provided with a threaded aperture 65 in their lower ends for connection to spindles 66 aligned with the respective firing pins 51 and each such spindle 66 has a hardened striker 67 secured to its lower end and confronting the firing pin 51. The strikers 67 and armatures 63 are urged upwardly by helical springs 68 acting between a collar 69 on its respective striker 67 and a shoulder in a hollow nut 70 screwed onto the upper end of the respective firing pin guide 52.

Operation of the tools 23 is controlled by electric switches comprising a foot switch 71 on a floor 72 at the marking station for foot operation by an operative at such station (FIGURE 1). Another locating switch 73 is mounted on a front plate 74 between the webs 21 (FIGURE 3) and this has an actuating member 75 projecting from the front ends of the frame above the casings 25 of the tools 23 and in alignment with a plunger 76. Plunger 76 is loaded by a spring 77 and projects from a housing 78 on a bridge piece 79 secured to the base plate 47 of the tools. The spacing between the actuating member 75 and the plunger 76 is such that the normally open switch 73 becomes closed only when the telescoping section 39 of the barrel has been pressed inwardly against the action of the spring 40 at which time the plate 47 at the front end of the telescoping section is engaged with the side of the slab. In addition to closing switch 73 the inward movement of telescoping section 39 brings the small gap between the confronting faces of the recoil piston 41 and the head 44 of the front plunger 45 into register with the radially inner end of the cartridge chamber 50.

Figure 6:
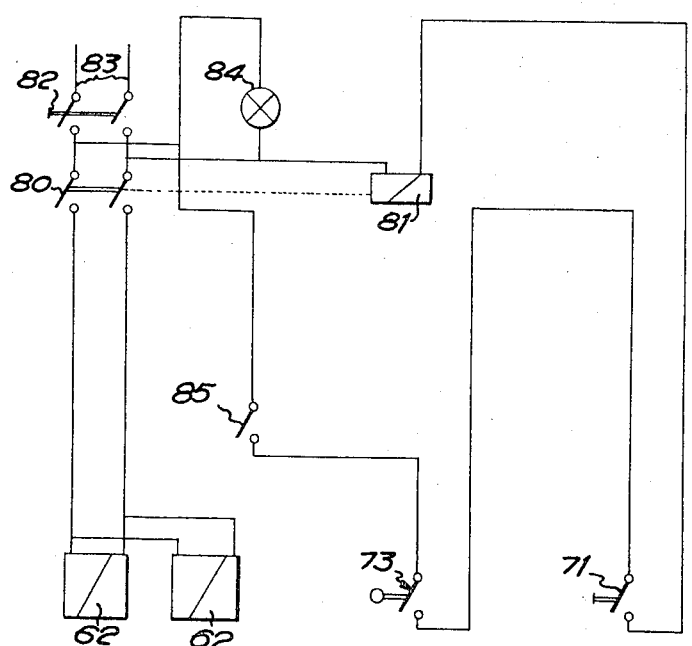
FIGURE 6 is a simplified electric circuit diagram for controlling the firing of the apparatus of FIGURES 1 to 5.

FIGURE 6 of the drawings is a simplified circuit diagram of the apparatus. As can be seen from this figure, the solenoids 62 are connected in parallel through a normally-open solenoid-operated double-pole switch 80 having an actuating solenoid 81 and a line switch 82 to supply leads 83. An indicator lamp 84 and the solenoid 81 are connected in parallel across the line beyond the line switch 82 and the solenoid 81 is connected in series with the normally open foot switch 71, safety switch 73 and a manually-operable switch 85 mounted at a convenient location at the marking station. The solenoid operated switch 80 is appropriately secured to the mounting plate 64, see FIGURE 3, and is actuated to closed position only when all three switches 71, 73 and 85 are closed. One embodiment of the invention having now been described in detail, the mode of operation of the apparatus is next explained.

Let it be assumed that a rolled slab 86 (FIGURE 1) has been arrested at the marking station and is ready for application of an identification plate thereto, and that the apparatus is in an unloaded condition with the carriage 13 retracted away from the rollers 10, i.e. in the full line position in FIGURE 1.

To load the tools 23 with propellant cartridges, the catch 59 is manually actuated to release the hooks 34 on the barrels 33 of the tools (FIGURE 4). This permits the tools 23 to swing down simultaneously to a substantially vertically extending loading position, as indicated in dotted line in FIGURE 3, where the cartridge chambers 50 are exposed. Cartridges (not shown) are then loaded into the two cartridge chambers 50 and the tools 23 are then swung back to and latched in their original horizontal "ready" positions closely adjacent the base plate 22, and a fastener is loaded into the front end of each telescoping barrel section 39. Preferably, each such fastener is of nail-like form, as shown in FIGURE 4, having an enlarged head 87 fitting into a respective recess 88 of the shank 45 of the respective front plunger 43, and a ballistically-shaped shank 89. A circular washer 90 is provided on each shank 89 which fits snugly into the recess 49 of its respective telescoping barrel section base plate 47. The fasteners are, of course, of hardened metal.

An identification plate 91 is now prepared by use of an appropriate typewriter-like embossing machine (not shown) which embosses desired identification data on the plate 91, and the latter is then located on the combined base plate 47 of the two tools so that the tips of the shanks 89 of the two fasteners are aligned with respective holes 92 (FIGURE 4) in the plate 91. A shallow step 93 (FIGURE 4) is provided on the base plate 47 to form a frame for locating the plate 91, and the magnet 48 serves to retain the plate 91 in the position in the frame.

When the line switch 82 is closed, the lamp 84 is illuminated to indicate that a current supply is available. The operative now operates the manual switch 85 to close the same and also applies his foot to the foot switch 71 to close this switch. This leaves the safety switch 73 and the solenoid-operated switch 80 still open and the solenoids 62 are, accordingly, de-energized.

By use of a handle 94 (which is articulated at 95 to enable it to be swung to an out-of-the-way position as shown in full lines in FIGURE 1) the carriage 13 is propelled along the rails 11 towards the dotted line position shown in FIGURE 1 where it abuts the side of the slab. Upon engagement with the slab 86, the base plate 47 stops while the carriage continues to move toward the slab to cause a relative movement of the tools 23 and their telescoping barrel parts 39, so that the latter become pressed into the tools 23 until the plunger 76 engages the actuating member 75 of the safety switch 73 to close the latter. Thus, switch 73 is closed substantially instantaneously with engagement of the base plate 47 with the slab 86. When switch 73 closes, the solenoid 81 for operating switch 80 becomes energized to close the switch 80 and energizing solenoids 62. The armatures 63 of the solenoids 62 are then propelled downwards against the action of the springs 68 to cause the strikers 67 to strike the firing pins 51 which, in turn, impact the cartridges in the chambers 50.

The resultant firing of the cartridges produces gases which enter the barrels 33 between the respective recoil pistons 41 and the heads 44 of the front plungers 43 to propel the latter towards the slab 86 and drive the respective fasteners successively through the identification plate 91 and into the slab. During this driving operation, the washers 90 move up the shanks 89 of the fasteners until they abut by the head 87 which prevents the fasteners from passing completely through the identification plate 91 and achieve a reliable attachment of the plate 91 to the slab. Recoil is taken up by the recoil piston 41 and the sleeve 31 is displaced in a direction opposite the direction to the plunger 43 against the action of its spring 29.

It will be observed that unintentional detonation of the cartridge cannot occur since the solenoids 81 and 62 cannot be energized until the manual switch 85 and foot switch 71 have consciously been actuated by the operator and the tool has been propelled to the dotted position of FIGURE 1 to cause the base plate 47 of the tools to abut the slab and move inwardly relative to the barrel sections 39 a sufficient distance to actuate the safety switch 73.

Once the plate 91 has been attached, the carriage 13 can now be moved away from the slab 86 and back to the full line position of FIGURE 1 where the tools may be reloaded. When the catch 59 is actuated to permit the tools 23 to swing down to the loading position, the cams 56 actuate the ejectors 54 about pivot pins 57 to ensure ejection of the spent cartridge cases.

Figure 7:
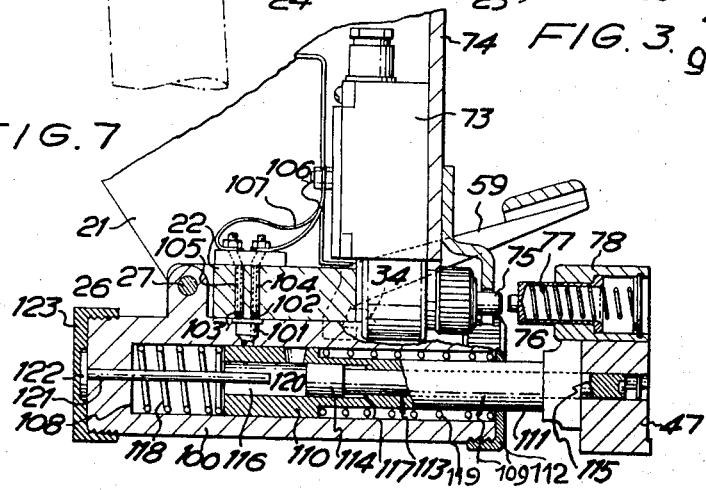
FIGURE 7 is a fragmentary detail, partly in section, showing an alternative embodiment of the fastener driving tools.
Figure 5:
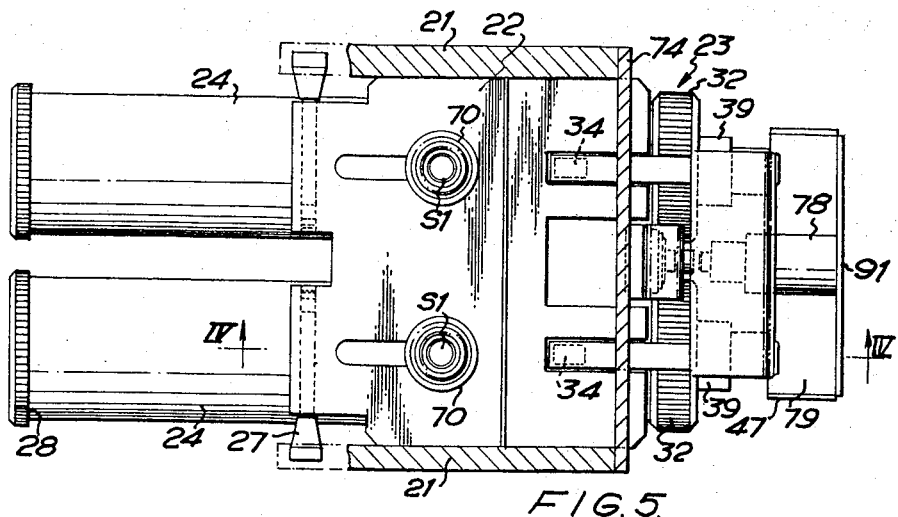
FIGURE 5 is a cross-sectional plan taken on the line V—V of FIGURE 3.

Referring now to FIGURE 7, this figure diagrammatically illustrates an alternative form of fastener-driving tool which may be employed in the apparatus of FIGURES 1 to 6, and which enables electrically-detonatable cartridges to be employed. In this construction the parts which are similar to those already described with reference to FIGURES 1 to 6 have been given the same reference numerals and further explanation thereof is, accordingly, unnecessary.

In this instance, each tool comprises a hollow tubular body 100 having a radially directed cartridge chamber 101 registering with a pair of terminal contacts 102, 103 which are insulated from the body 100 by sleeves 104, 105 and connected, by way of leads 106, 107. These leads 106 and 107 are connected in series with the switch 73, as well as the manual switch 85 and the foot switch 71, as shown in FIGURE 6 so that the circuit thereof is similar to that of FIGURE 6, but with the solenoid-operated switch 80 and the solenoids 81 and 62 omitted.

The cartridge chamber 101 communicates with bore 108 of the body 100. Bore 108 is open at the front end only of the tool and accommodates a barrel 109 having an enlarged head 110 at one end and formed at its other end with a reduced shank 111 which protrudes through an end cap 112 screwed onto the front end of the body 100 and terminates in the base plate 47. The barrel 109, in turn, is hollow and accommodates a front plunger 113 having an enlarged head 114 and a reduced shank 115. The bore and counterbore 116 in the barrel 109 for accommodating the plunger 113 provide an annular shoulder 117 which limits axial movement of the plunger. A spring 118 in the body 100 abuts the head 110 to urge the barrel 109 to the position illustrated and is balanced by a spring 119 acting in the opposite direction. When springs 118 and 119 are in equilibrium a passage 120 in the head 110 is out of register with the cartridge chamber 101. However, when the barrel 109 is pressed into the body against the action of the spring 118 by engagement of the end cap 112 with the article, the passage 120 will be brought into register with chamber 101.

An axial rod 121 extends through the closed end of the body 100 and is held in place by an end disc 122 clamped against such closed end of the body by an end cap 123. Rod 121 serves to prevent the plunger 113 from being moved to the left as viewed in the drawing a sufficient distance to cover passage 120 when the barrel 109 is pressed into the body.

This embodiment of the apparatus is loaded and operated in exactly the same way as in the previously described embodiment. Detonation is initiated, however, by a momentary supply of electric current from the power lines through the two electrode contacts 102 and 103 and complementary contacts on an electrically-detonatable cartridge in the chamber 101. Such detonation can only occur when the barrel is pressed in to close the switch 73 and the passage 120 is in register with the cartridge chamber 101, so that the resultant combustion gases from the cartridge act upon the plunger 113 to drive the fastener, for fastening of the identification plate.

The invention is not confined to the precise details of the foregoing examples, and many variations are possible. For instance, any suitable support or mounting can be provided for the tools to permit them to be shifted between their loading and firing positions, and in the described embodiment a motor can be provided for driving the carriage.

Any suitable form of cartridge-actuated fastener-driving tool, provided with remote electric, hydraulic, pneumatic or mechanical actuating means can be employed, although the side-loading front plunger types of tool described have the advantages of ease of loading and safety in operation, it being understood of course that in practice suitable safeguards must be provided to prevent unintentional cartridge detonation. The apparatus could, of course, have only a single fastener-driving tool, or in special circumstances three of four such tools may be provided. Furthermore, the invention is not confined in its application to steel works, and can have other applications. For example, it could be used in atomic energy establishments for applying identification marking to heavy lead containers of radiation material in circumstances where the approach of personnel close to the containers would be dangerous. The fasteners and the plate, in the described embodiment, could, if desired, be supplied as a preformed entity with the fasteners already partly pressed through the plate at appropriate locations thereof, so that the insertion of the fasteners into the respective tools serves to position the plate ready for fixing.

Therefore, without limitation in this respect, the invention is defined by the following claims.

I claim:

1. Apparatus for applying an identifying plate to a remotely located article comprising a track, a carriage mounted on said track for movement from an inoperative loading position remote from the article to be identified to an operative position adjacent said article, means for mounting an identifying plate on the side of the carriage adjacent the article, a fastener driving tool on said carriage rearwardly of the means for mounting the identifying plate and having a chamber for receiving a cartridge of on explosive material, firing mechanism on the carriage for firing the cartridge, and means for mounting the driving tool on the carriage for movement from an open cartridge loading position to a close cartridge firing position.

2. Apparatus for applying an identifying plate in accordance with claim 1 in which the identifying plate is of a magnetic material, and the means for mounting the plate on the carriage is a frame of a size and shape to receive the plate and a magnet at the rear of the frame to hold the plate therein.

3. Apparatus for applying an identifying plate in accordance with claim 1 in which the means for mounting the plate and fastener driving tool are mounted on the carriage to swivel about a vertical axis so as to adjust the position of the plate to engage it with a flat side of the article.

4. Apparatus for applying an identifying plate in accordance with claim 1 in which the fastener driving tool comprises a pair of drivers mounted on said carriage to simultaneously drive a pair of fasteners through the identifying plate and into the article.

5. Apparatus for applying an identifying plate in accordance with claim 1 in which the means for mounting the driving tool on said carriage for movement from an open cartridge loading to closed cartridge firing positions comprises a hinge for mounting the fastener driving tool on the carriage to swing downwardly to an open position, a cartridge receiving chamber in the side of the tool adjacent the carriage, and a latch for holding the fastener driving tool in closed position against the carriage.

6. Apparatus in accordance with claim 5 in which a manually operable handle is provided to release the latch.

7. Apparatus for applying an identifying plate in accordance with claim 1 in which the firing mechanism comprises a firing pin on the carriage, an electric solenoid for actuating the firing pin, and an electric circuit having a control switch for energizing the solenoid.

8. Apparatus in accordance with claim 7 in which a safety control switch is provided in the electric control circuit, said switch being normally open and mounted on the carriage at the side adjacent the article, and said switch having a spring pressed plunger operated by engagement with the article to close the switch when the fastener driving tool engages the article whereby to prevent the driving of a fastener except when the plate is positioned adjacent the side of the article.

9. Apparatus in accordance with claim 5 in which an ejector is provided for ejecting a cartridge casing from the cartridge chamber, and operating means for the injector controlled by movement of the fastener driving tool relative to the carriage to its open cartridge receiving position.

10. Apparatus in accordance with claim 1 in which the identifying plate is a metal plate, the remotely located article is a rolled metal billet in a rolling mill and the fastener is a stud driven through the plate and into the rolled metal billet.

References Cited

UNITED STATES PATENTS

| | | | |
|---|---|---|---|
| 2,780,810 | 2/1957 | Catlin et al. | 227—9 |
| 2,869,563 | 1/1959 | Schoengrun | 227—9 |
| 3,325,074 | 6/1967 | Batliner et al. | 227—8 |

GRANVILLE Y. CUSTER, JR., *Primary Examiner.*